April 20, 1926. Re. 16,333

R. CAROSELLI

ELECTRIC LIGHTING FIXTURE

Original Filed Dec. 1, 1924

Inventor
Romulus Caroselli.

By his Attorneys
Dean, Fairbank, Obright & Hirsch.

Reissued Apr. 20, 1926.

Re. 16,333

UNITED STATES PATENT OFFICE.

ROMULUS CAROSELLI, OF DETROIT, MICHIGAN, ASSIGNOR, BY MESNE ASSIGNMENTS, TO NATHAN URELES, OF NEW YORK, N. Y.

ELECTRIC-LIGHTING FIXTURE.

Original No. 1,542,032, dated June 16, 1925, Serial No. 753,404, filed December 1, 1924. Application for reissue filed December 23, 1925. Serial No. 77,392.

*To all whom it may concern:*

Be it known that I, ROMULUS CAROSELLI, an Italian subject, residing at Detroit, county of Wayne, State of Michigan, have invented a certain new and useful Improvement in Electric-Lighting Fixtures, and declare the following to be a full, clear, and exact description of the same, such as will enable others skilled in the art to which it pertains to make and use the same, reference being had to the accompanying drawings, which form a part of this specification.

My invention relates to a device for supporting an electric light wall bracket and switch, shown in the accompanying drawings and more particularly described in the following specification and claims.

Heretofore it has been customary to provide a wall bracket electric light fixture with holes adapted to receive the screws or other devices employed to secure it to the wall—an additional opening in the bracket being also provided to receive a push button or like device to control the operation of the switch.

The primary object of this invention therefore is to provide a simple and inexpensive device adapted to secure the wall bracket of an electric light fixture to a wall without punching a plurality of holes in the bracket for the passage of screws and a switch button, and without the employment of screws or like fastening devices to secure it to the wall.

A further object of the invention is to provide an adjustable device for supporting the bracket adapted to readily accommodate itself to different forms of bracket fixture construction.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 3:
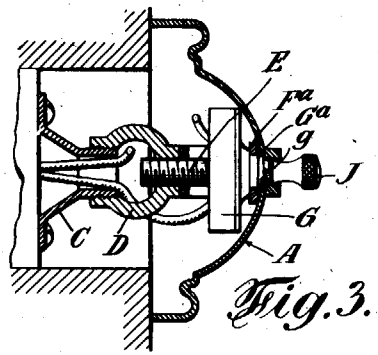
Figure 3 is a horizontal sectional view taken on or about line 3—3 of Figure 1.
Figure 2:
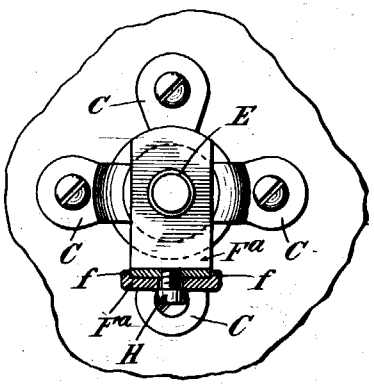
Figure 2 is a cross-sectional view taken on or about line 2—2 of Figure 1.
Figure 1:
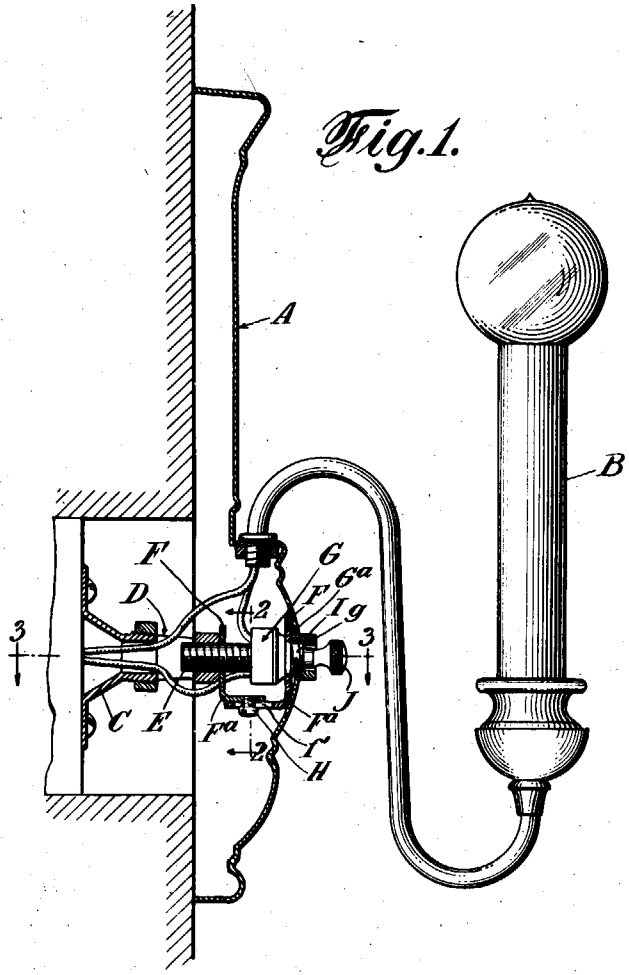
Figure 1 is a side elevation and sectional view of an electric light wall bracket showing an adjustable fixture for securing the bracket to the usual hickey,—also a stud for supporting the latter attached to the wall of an outlet opening.

Referring now to the letters of reference placed upon the drawings:

A denotes a typical electric light wall bracket or panel to which is secured a lamp fixture B.

C indicates a stud of usual construction attached to the wall of the outlet opening, upon which is mounted a hickey D, tapped to receive an adjustable nipple E, screwed therein.

F designates an electric light wall bracket supporting fixture comprising a pair of L-shaped telescoping plates $F^a$, $F^a$, respectively bored to receive the nipple E, and also a flange $G^a$ extending from the wall of an electric switch G, of usual construction.

The switch G is rigidly held between the walls of the bracket supporting fixture or yoke F by the nipple E, screwed in the hickey—adjusted so as to force the switch tightly against one of the walls of the fixture or yoke.

One of the L-shaped plates of the bracket supporting fixture or yoke is provided with side flanges *f*, *f*,—overlapping the edges of the other plate,—also an elongated slot *f'*, through which extends a screw H for securing the plates together when properly adjusted.

I denotes a nut—overlapping the wall bracket A—screwed upon a nipple or shank *g* projecting from the wall of the switch G to secure the latter to the adjustable fixture F and thus without other engaging devices against the wall of the room.

J indicates the milled head of the rotatable stem of the switch, extending through the nipple, to turn the light on or off as may be required.

Having now indicated the several parts by reference letters the construction and operation of the device will be readily understood:

The L-shaped plates of the supporting fixture F are first adjusted as may be required to accommodate the desired wall bracket of the electric fixture to be installed;—the switch is then assembled between the walls of the supporting fixture or yoke and the nipple E adjusted to force the switch rigidly against a wall of the latter. The wall bracket is then placed in position,—the nut I being adjusted to force the bracket against the supporting fixture F, thus attaching the bracket securely and without other fastening devices to the wall of the building.

Having thus described my invention what I claim is:

1. A wall lighting fixture comprising a panel having a rim to face the wall to which the fixture is applied, a support having a part adapted to be threaded upon an outlet box stud and having a switch holding part near the outer end thereof adjustable in position for adaptation with respect to the inner face of the panel, a switch having a casing with a threaded shank protruding through said panel, and a nut at the exterior of the panel threaded upon said shank and holding said panel in position.

2. In a wall bracket, in combination, a panel, a switch, a casing therefor, means serving to secure said panel in position and said casing within said panel, said means including a yoke carried by the stud of an outlet box, said yoke having an arm for coaction with the inner face of the panel, said switch casing including a threaded shank protruding through corresponding apertures in the yoke arm and in the panel, a nut threaded upon said shank drawing said panel against said yoke arm, and a switch operating element protruding through said nut.

3. In a lighting fixture, in combination, a switch carrying yoke member, said yoke member being adapted to be affixed with respect to an outlet box stud, a panel having a rim adapted to face the wall to which the fixture is applied, said yoke member being adjustable to locate its outer arm in accordance with the depth or convexity of the panel, and threaded securing means accessible from the outer face of the panel to secure the latter with respect to the yoke, said switch being of the snap type and having an operating member protruding through said threaded securing means.

4. A wall bracket having a structure including a threaded member adapted for attachment to an outlet box stud, a panel, a switch casing, said structure including a threaded nipple adjustable with respect to the stud, said casing including a threaded shank protruding through the panel, a nut threaded thereon for holding the switch casing against the panel and for holding the panel in position, and a switch operating member protruding through said nut.

5. A wall lighting fixture comprising a yoke including an inner part carried by the stud of an outlet box, and an outer part adjustable with respect thereto, a switch casing extending between said yoke parts, a lamp carrying panel enclosing the yoke and the switch casing, securing means at the exterior of said panel and clamping the same against said yoke, and switch operating means protruding through said panel.

6. A wall lighting fixture comprising a yoke, including an inner part carried by the stud of an outlet box, and an outer part adjustable with respect thereto, a switch casing extending between said yoke parts, a lamp carrying panel enclosing the yoke and the switch casing, said casing including a shank protruding through the panel, a nut at the exterior of the panel threaded upon said shank and clamping the panel against the yoke, and switch operating means protruding through said nut.

ROMULUS CAROSELLI.